(12) United States Patent
Melis et al.

(10) Patent No.: US 8,893,685 B2
(45) Date of Patent: Nov. 25, 2014

(54) METHOD FOR ESTIMATING AN HYDRAULIC DWELL TIME BETWEEN TWO INJECTION PULSES OF A FUEL INJECTOR

(75) Inventors: Massimiliano Melis, Rivoli (IT); Matteo Allasia, Fossan (IT); Vincenzo Rampino, Turin (IT)

(73) Assignee: GM Global Technology Operations LLC, Detroit, MI (US)

( * ) Notice: Subject to any disclaimer, the term of this patent is extended or adjusted under 35 U.S.C. 154(b) by 583 days.

(21) Appl. No.: 13/182,484

(22) Filed: Jul. 14, 2011

(65) Prior Publication Data
US 2012/0035833 A1 Feb. 9, 2012

(30) Foreign Application Priority Data
Aug. 3, 2010 (GB) .................................. 1013023.5

(51) Int. Cl.
*F02M 51/00* (2006.01)
*F02D 41/40* (2006.01)
(52) U.S. Cl.
CPC ............ *F02D 41/402* (2013.01); *F02D 41/401* (2013.01); *F02D 41/403* (2013.01); *Y02T 10/44* (2013.01)
USPC ........ 123/478; 123/490; 701/105; 73/114.45; 73/114.49
(58) Field of Classification Search
USPC .......... 123/299, 300, 478, 490; 701/102–105; 73/114.45, 114.49
See application file for complete search history.

(56) References Cited

U.S. PATENT DOCUMENTS

| 5,471,963 | A  | * | 12/1995 | Nishioka et al. | 123/478 |
| 5,924,403 | A  | * | 7/1999  | Thomas          | 123/300 |
| 6,102,009 | A  | * | 8/2000  | Nishiyama       | 123/490 |
| 6,164,264 | A  | * | 12/2000 | Thomas          | 123/300 |
| 6,192,856 | B1 | * | 2/2001  | Shioi et al.    | 123/300 |
| 6,237,572 | B1 |   | 5/2001  | Carrell et al.  |         |
| 6,276,337 | B1 | * | 8/2001  | Minato          | 123/456 |
| 6,354,274 | B1 | * | 3/2002  | Shima et al.    | 123/478 |
| 6,467,452 | B1 | * | 10/2002 | Duffy et al.    | 123/299 |
| 6,516,773 | B2 | * | 2/2003  | Dutart et al.   | 123/299 |
| 6,584,953 | B2 | * | 7/2003  | Yomogida        | 123/300 |
| 6,622,692 | B2 | * | 9/2003  | Yomogida        | 123/299 |
| 6,691,671 | B2 | * | 2/2004  | Duffy et al.    | 123/299 |
| 6,705,277 | B1 | * | 3/2004  | McGee           | 123/299 |

(Continued)

FOREIGN PATENT DOCUMENTS

DE 10200541815 A1 3/2006
EP 1544446 A2 6/2005

*Primary Examiner* — Thomas Moulis
(74) *Attorney, Agent, or Firm* — Ingrassia Fisher & Lorenz, P.C.

(57) ABSTRACT

A method is provided for estimating a hydraulic dwell time between a first injection pulse and a second injection pulse performed by a fuel injector of an internal combustion engine. The method includes, but is not limited to determining a value of an electric dwell time between the first injection pulse and the second injection pulse, estimating a value of an injector closing delay between an instant in which an electric closing command of the first injection pulse is generated and an instant in which the fuel injector closes, estimating a value of an injector opening delay between an instant in which an electric opening command of the second injection pulse is generated and an instant in which the fuel injector opens, and calculating a value of the hydraulic dwell time as a function of the electric dwell time value, of the injector closing delay value and of the injector opening delay value.

19 Claims, 4 Drawing Sheets

(56) References Cited

U.S. PATENT DOCUMENTS

| | | | |
|---|---|---|---|
| 6,705,278 B2 * | 3/2004 | McGee et al. | 123/299 |
| 6,732,715 B2 * | 5/2004 | Fallahi et al. | 123/480 |
| 6,848,414 B2 * | 2/2005 | West et al. | 123/299 |
| 6,879,903 B2 * | 4/2005 | Jaliwala et al. | 701/104 |
| 7,021,278 B2 * | 4/2006 | Ishizuka et al. | 123/299 |
| 7,113,862 B2 * | 9/2006 | Radue | 701/103 |
| 7,219,005 B2 * | 5/2007 | Mazet | 701/104 |
| 7,273,038 B2 * | 9/2007 | Hayakawa | 123/478 |
| RE40,144 E * | 3/2008 | Duffy et al. | 123/299 |
| 7,392,491 B2 * | 6/2008 | Ismailov | 716/106 |
| 7,472,689 B2 * | 1/2009 | Ishizuka et al. | 123/446 |
| 7,720,594 B2 * | 5/2010 | Walsh et al. | 701/105 |
| 8,171,914 B2 * | 5/2012 | Atzler et al. | 123/435 |
| 8,539,935 B2 * | 9/2013 | Nakata et al. | 123/480 |
| 2006/0149456 A1 * | 7/2006 | Radue | 701/105 |
| 2006/0249120 A1 * | 11/2006 | Semii et al. | 123/446 |
| 2008/0027625 A1 * | 1/2008 | Kloos et al. | 701/103 |
| 2009/0063017 A1 | 3/2009 | Yamada et al. | |
| 2010/0186708 A1 * | 7/2010 | Ricco et al. | 123/299 |
| 2012/0035832 A1 * | 2/2012 | Stucchi et al. | 701/104 |
| 2012/0095668 A1 * | 4/2012 | Landsmann et al. | 701/103 |
| 2013/0074806 A1 * | 3/2013 | Casalone et al. | 123/456 |
| 2013/0167808 A1 * | 7/2013 | Stucchi et al. | 123/478 |

* cited by examiner

METHOD FOR ESTIMATING AN HYDRAULIC DWELL TIME BETWEEN TWO INJECTION PULSES OF A FUEL INJECTOR

CROSS-REFERENCE TO RELATED APPLICATION

This application claims priority to British Patent Application No. 1013023.5, filed Aug. 3, 2010, which is incorporated herein by reference in its entirety.

TECHNICAL FIELD

The technical field relates to a method for estimating a hydraulic dwell time between a first injection pulse and a second injection pulse performed by a fuel injector of an internal combustion engine of a motor vehicle.

BACKGROUND

It is known that most internal combustion engines, and particularly the diesel engines, are nowadays provided with a fuel injection system. A conventional fuel injection system comprises a fuel rail and a plurality of electrically controlled fuel injectors, which are hydraulically connected with the fuel rail through respective feeding conduits. Each fuel injector generally comprises a fuel inlet, a fuel outlet and a movable needle which repeatedly opens and closes the fuel outlet, thereby injecting the fuel into the engine through a plurality of separated injection pulses.

The movable needle is actuated with the aid of a dedicated actuator, typically a solenoid actuator or a piezoelectric actuator, which is driven by an electric circuit controlled by an engine control unit (ECU). The ECU operates each injection pulse by generating an electric opening command, causing the needle to open the fuel injector, and a subsequent electric closing command, causing the needle to close the fuel injector.

The timing of the opening and closing electric commands is still controlled by the ECU, which determines two key parameters for each injection pulse, namely an electric dwell time and an electric energizing time. The electric dwell time is the time between the instant in which the electric opening command of an injection pulse is generated, and the instant in which the electric closing command of the previous injection pulse was generated.

The electric energizing time is the time between the instant in which the electric opening command of an injection pulse is generated, and the instant in which the electric closing command of the same injection pulse will be generated. The electric energizing time is generally determined by ECU as a function of the quantity of fuel to be injected in the course of the injection pulse, taking into account the value of the pressure inside the fuel rail.

However, the quantity of fuel injected in the course of a single injection pulse is not really related to the fuel rail pressure value, but it is rather related to the pressure in the fuel injector inlet at the instant in which the movable needle actually opens the fuel injector outlet, which does not always corresponds to the fuel rail pressure value. Indeed, the pressure in the fuel injector inlet is influenced by a pressure wave, which is generated by the previous fuel injection pulse performed by the same fuel injector, and which propagates along the feeding conduit connecting the fuel injector to the fuel rail, thereby producing a pressure fluctuation in the neighborhood of the fuel rail pressure value.

Starting from the end of the previous injection pulse, this pressure fluctuation progressively dampens, and stabilizes at the fuel rail pressure value after a damping period depending on the rail pressure value itself, and further depending on the fuel quantity which has been injected by the fuel injector in the course of the previous injection pulse. Therefore, this pressure fluctuation can generally be disregarded when the time between two subsequent injection pulses is sufficiently long, such as for example when the fuel injector is provided for performing one single injection pulse per engine cycle; but it must be strictly taken into account when the time between two subsequent injection pulses is very short, such as for example when the fuel injector is provided for performing a plurality of injection pulse per engine cycle.

To disregard the pressure fluctuation in this latter case could result in a deviation of the injected fuel quantity with respect to the expected one, leading to a worse fuel combustion and to polluting emissions and noise increases. In order to avoid such drawback, many strategies have been recently considered, which provide to take into account the pressure fluctuation effect. One of these strategies provides for applying a proper correcting factor to the pressure value measured in the fuel rail.

This correcting factor is determined by the ECU using an empirically determined map, which correlates the correcting factor to the electric dwell time preceding the injection pulse, to the fuel quantity injected in the course of the previous injection pulse, and to a plurality of other important engine operating parameters, such as engine speed and engine load.

Another strategy provides for modeling the pressure fluctuation according to a mathematical equation, which returns the value of the pressure in the fuel injector inlet as a function of the fuel rail pressure value and of the time elapsed from the end of the previous injection pulse. According to this strategy, the pressure value in the fuel injector inlet is therefore estimated by applying the electric dwell time and the fuel rail pressure value to the above mentioned mathematical equation.

A drawback of both these strategies is that, due to the mechanical characteristics of the fuel injectors, specially of the solenoid injectors, the instant in which the ECU generates the electric opening command does not coincide with the instant in which the movable needle actually opens the fuel injector, as well as the instant in which the ECU generates the electric closing command does not coincide with the instant in which the movable needle actually closes the fuel injector. As a consequence, the use of the electric dwell time as entry parameter in the above mentioned map or mathematical equation can still cause a significant error in the estimation of the pressure value in the fuel injector inlet, resulting in a correspondent error in the injected fuel quantity.

In view of the above, it is at least one object to provide a physical parameter capable to better represent the time period between two subsequent injection pulses performed by a fuel injector. In addition, other objects, desirable features and characteristics will become apparent from the subsequent summary and detailed description, and the appended claims, taken in conjunction with the accompanying drawings and this background.

SUMMARY

An embodiment provides a method for estimating an hydraulic dwell time between a first injection pulse and a second injection pulse performed by a fuel injector of an internal combustion engine, wherein each injection pulse is operated with the step of generating an electric opening command, causing the fuel injector to open, and a subsequent electric closing command, causing the fuel injector to close, and wherein the hydraulic dwell time between the first and the second injection pulse is the time between the instant in which the fuel injector actually closes thereby ending the first injection pulse and the instant in which the fuel injector actually opens thereby starting the second injection pulse.

The method comprises the steps of: determining a value of an electric dwell time between the first injection pulse and the second injection pulse, estimating a value of an injector closing delay between the instant in which the electric closing command of the first injection pulse is generated and the instant in which the fuel injector closes, estimating a value of an injector opening delay between the instant in which the electric opening command of the second injection pulse is generated and the instant in which the fuel injector opens, calculating a value of the hydraulic dwell time as a function of said electric dwell time value, of said injector closing delay value and of said injector opening delay value.

The hydraulic dwell time estimated according to this embodiment is a physical parameter which quantitatively describes the actual operation of the fuel injector more precisely and effectively than the electric dwell time. As a consequence, this parameter can be advantageously used for operating the fuel injector, e.g., for determining the correct energizing time for the fuel injector, and for example in the mentioned strategies for determining the pressure in the fuel injector inlet at the instant in which the fuel injector actually opens.

According to an embodiment, the estimation of the injector closing delay value comprises the steps of: determining a value of the pressure inside a fuel rail hydraulically connected with the fuel injector, determining a value of an electric energizing time of the first injection pulse, and estimating the value of the injector closing delay on the basis of said fuel rail pressure value and of said electric energizing time value. As a matter of fact, it has been experimentally found that the injector closing delay is generally affected by the pressure inside the fuel rail and also by the length of the first injection pulse, which can be expressed in term of electric energizing time. As a consequence, the above mentioned embodiment of the invention advantageously provides a reliable estimation of the injector closing delay value.

According to another embodiment, the value of the injector closing delay can be estimated by means of an empirically determined map correlating the injector closing delay value to the fuel rail pressure value and to the electric energizing time value. This map can be determined through an experimental activity on a test bench, wherein a test fuel injector is operated under different values of the fuel rail pressure and under different values of the electric energizing time. For each couple of these values, the calibration activity further provides for measuring the injector closing delay and to set the measured value in the map.

This empirically determined map can be advantageously used for all the internal combustion engines equipped with fuel injectors of the same kind of the test one. In particular, the map can be stored in a data carrier associated to an ECU of each of said internal combustion engine, thereby providing a simple way for the ECU to determine the injector closing delay of each injection pulse.

According to another embodiment, the value of the injector closing delay can be estimated by means of a mathematical model, for example a lumped parameter model of the fuel injector, which returns the value of the injector closing delay as a function of the fuel rail pressure value and of the electric energizing time value. This embodiment has the advantage that the validation of the mathematical model generally requires less experimental activities than the empirically determination of the map.

According to still another embodiment, the estimated value of the injector closing delay can be corrected by applying to it an empirically determined correction factor. This correction factor can be determined for each individual internal combustion engine at the end of the production line, for example by the steps of measuring the injector opening delay of the fuel injectors of the engine, of calculating the difference between this measured value and the estimated value of the injector opening delay as provided by the map or by the mathematical model, and of determining the correction factor on the basis of this difference. This correction factor can be memorized in another map and stored in the data carrier associated to the ECU, allowing the latter to correct the injector closing delay during the normal operation of the internal combustion engine. Due to this embodiment, it is advantageously possible to compensate the different injector closing delays to which fuel injectors of the same kind can be subjected, due for example to the production spread.

According to an embodiment, the estimation of the injector opening delay value comprises the steps of: determining a value of the pressure inside the fuel rail hydraulically connected with the fuel injector, and estimating the value of said injector opening delay on the basis of said fuel rail pressure value. As a matter of fact, it has been experimentally found that the injector opening delay is mainly affected only by the pressure inside the fuel rail. As a consequence, the above mentioned embodiment advantageously provides a reliable estimation of the injector opening delay value.

According to an embodiment, the value of the injector opening delay can be estimated by means of an empirically determined map correlating the injector opening delay value to the fuel rail pressure value. This map can be determined by means of an experimental activity on a test bench, wherein a test fuel injector is operated under different values of the fuel rail pressure. For each of these values, the calibration activity further provides to measure the injector opening delay and to set the measured value in the map.

The empirically determined map can be advantageously used for all the internal combustion engines equipped with fuel injectors of the same kind of the test one. In particular, the map can be stored in a data carrier associated to an ECU of each of said internal combustion engine, thereby providing a simple way for the ECU to determine the injector opening delay of each injection pulse.

According to another embodiment, the value of the injector opening delay can be estimated by means of a mathematical model, for example a lumped parameter model of the fuel injector, which returns the value of the injector opening delay as a function of the fuel rail pressure value. This embodiment has the advantage that the validation of the mathematical model generally requires less experimental activities than the empirically determination of the map.

According to still another embodiment, the estimated value of the injector opening delay can be corrected by applying to it an empirically determined correction factor. This correction factor can be determined for each individual internal combustion engine at the end of the production line, for example by the steps of measuring the injector opening delay of the fuel injectors of the engine, of calculating the difference between this measured value and the estimated value of the injector opening delay as provided by the map or by the mathematical model, and of determining the correction factor on the basis of this difference. This correction factor can be memorized in another map and stored in the data carrier associated to the ECU, allowing the latter to correct the injector opening delay during the normal operation of the internal combustion engine. Due to this embodiment, it is advantageously possible to compensate the different injector opening delays to which fuel injectors of the same kind can be subjected, due for example to the production spread.

A further embodiment provides a method for operating a fuel injector of an internal combustion engine, which comprises the steps of: determining a fuel quantity to be injected by said fuel injector in the course of an injection pulse, estimating a value of the hydraulic dwell time between said injection pulse and a previous injection pulse performed by the same fuel injector, estimating a pressure value in said fuel injector on the basis of said estimated value of the hydraulic dwell time, for example using the hydraulic dwell time value instead of the electric dwell time value in one of the pressure estimating strategies which has been disclosed in the preamble, using said determined fuel quantity and said estimated fuel inlet pressure value, in order to determine a value of an electric energizing time of the injection pulse, and operating the fuel injector according to this determined value of the electric energizing time. This solution has the advantage of providing a very effective control of the fuel quantity injected per injection pulse, since it takes into account a value of the pressure in the fuel injector inlet which is more reliable than that provided by the conventional estimation strategies.

The method according to an embodiment can be carried out with the help of a computer program comprising a program-code for carrying out all the steps of the method described above, and in the form of a computer program product comprising the computer program. The computer program product can be embodied as an internal combustion engine comprising a fuel injector, an ECU connected to the fuel injector, a data carrier associated to the ECU, and the computer program stored in the data carrier, so that, when the ECU executes the computer program, all the steps of the method described above are carried out. The method can be embodied as an electromagnetic signal, said signal being modulated to carry a sequence of data bits which represent a computer program to carry out all steps of the method.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
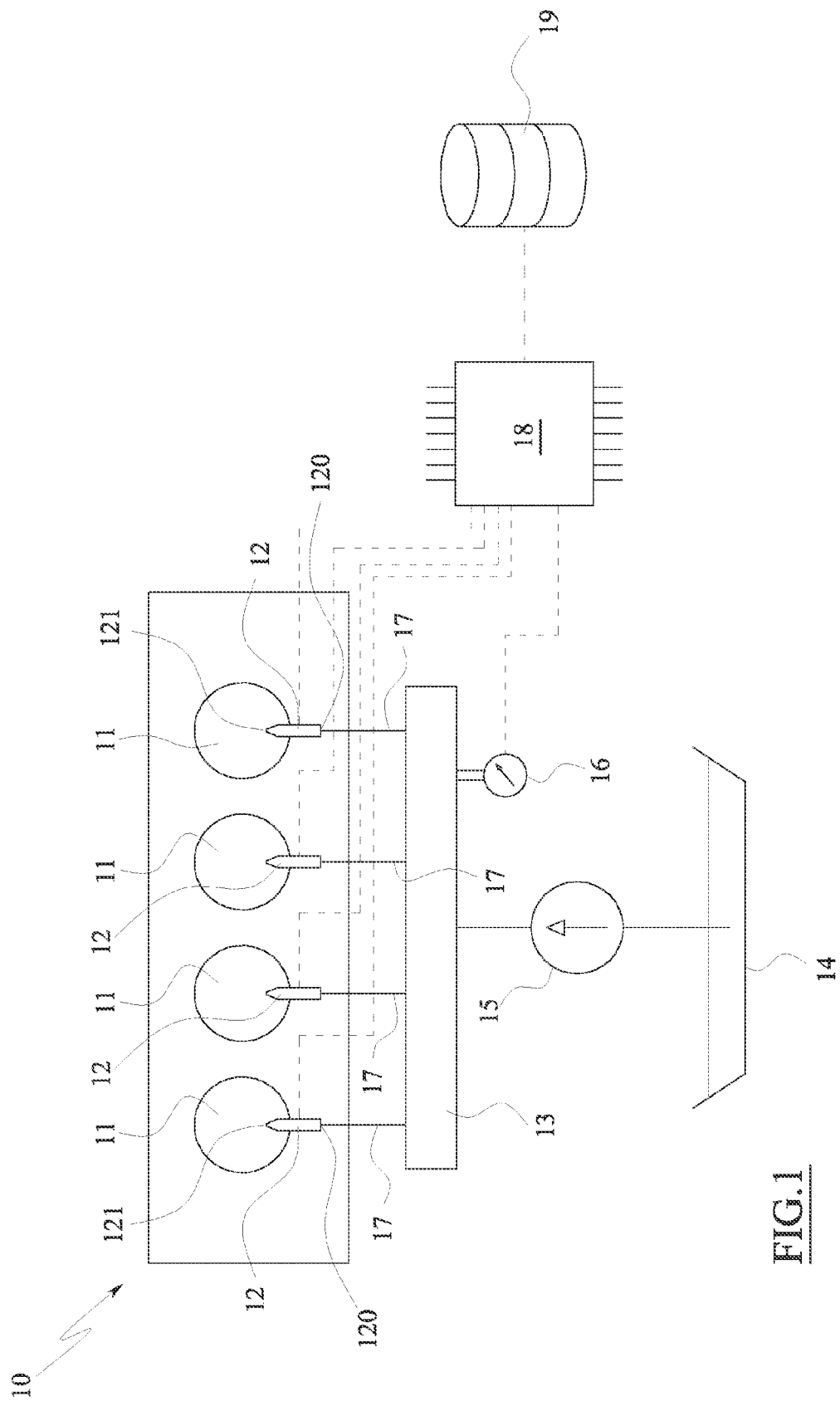
FIG. 1 is a schematic representation of an internal combustion engine.

FIG. 1 schematically illustrates an internal combustion engine 10 of a motor vehicle, in this case a Diesel engine. The internal combustion engine 10 comprises a plurality of cylinders 11 and a plurality of electrically controlled fuel injectors 12, each of which is set inside a respective cylinder 11. The internal combustion engine 10 further comprises a fuel rail 13 hydraulically connected with all the fuel injectors 12, a fuel tank 14, a pump 15 for supplying fuel from the fuel tank 14 into the fuel rail 13, conventional means (not shown) for regulating the pressure within the fuel rail 13, and a pressure sensor 16 set inside the fuel rail 13 for measuring the pressure therein.

Each fuel injector 12 generally comprises an inlet 120 hydraulically connected to the fuel rail 13 via a feeding conduit 17, an outlet 121 leading into the cylinder 11, and a needle (not shown) movable between a closing position, in which it closes the outlet 121 preventing the fuel to exit, and an opening position, in which it opens the outlet 121 allowing the fuel to be injected into the correspondent cylinder 11.

In the present embodiment, the needle is moved with the aid of a dedicated solenoid actuator (not shown), which is operated by an electric driving circuit configured for supplying the solenoid actuator with an electric current. When the solenoid actuator is supplied with the electric current, it moves the needle in the opening position. When this electric current is cut off, the needle returns in closing position pushed by a spring.

The electric driving circuit is controlled by an engine control unit (ECU) 18, which is provided for repeatedly generating an electric opening command, causing the electric driving circuit to supply the solenoid actuator with the electric current, followed by an electric closing command, causing the electric driving circuit to cut off the electric current. In this way, the needle is commanded by the ECU 18 so as to repeatedly open and close the fuel injector 12, in order to inject the fuel into the cylinder 11 through a plurality of separated injection pulses.

In particular, the ECU 18 of the present embodiment is configured for commanding the fuel injector 12 to perform a plurality of fuel injection pulses per engine cycle, according to a multi-injection pattern which generally comprises at least a first injection pulse, typically a pilot injection, followed by a second injection pulse, typically a main injection. The first injection pulse and the second injection pulse are respectively indicated with P and M in FIG. 2, wherein the solid line represents the plot of the electric current supplied to the solenoid actuator, and the dotted line represents the plot of the flow rate of the injected fuel.

Figure 2:
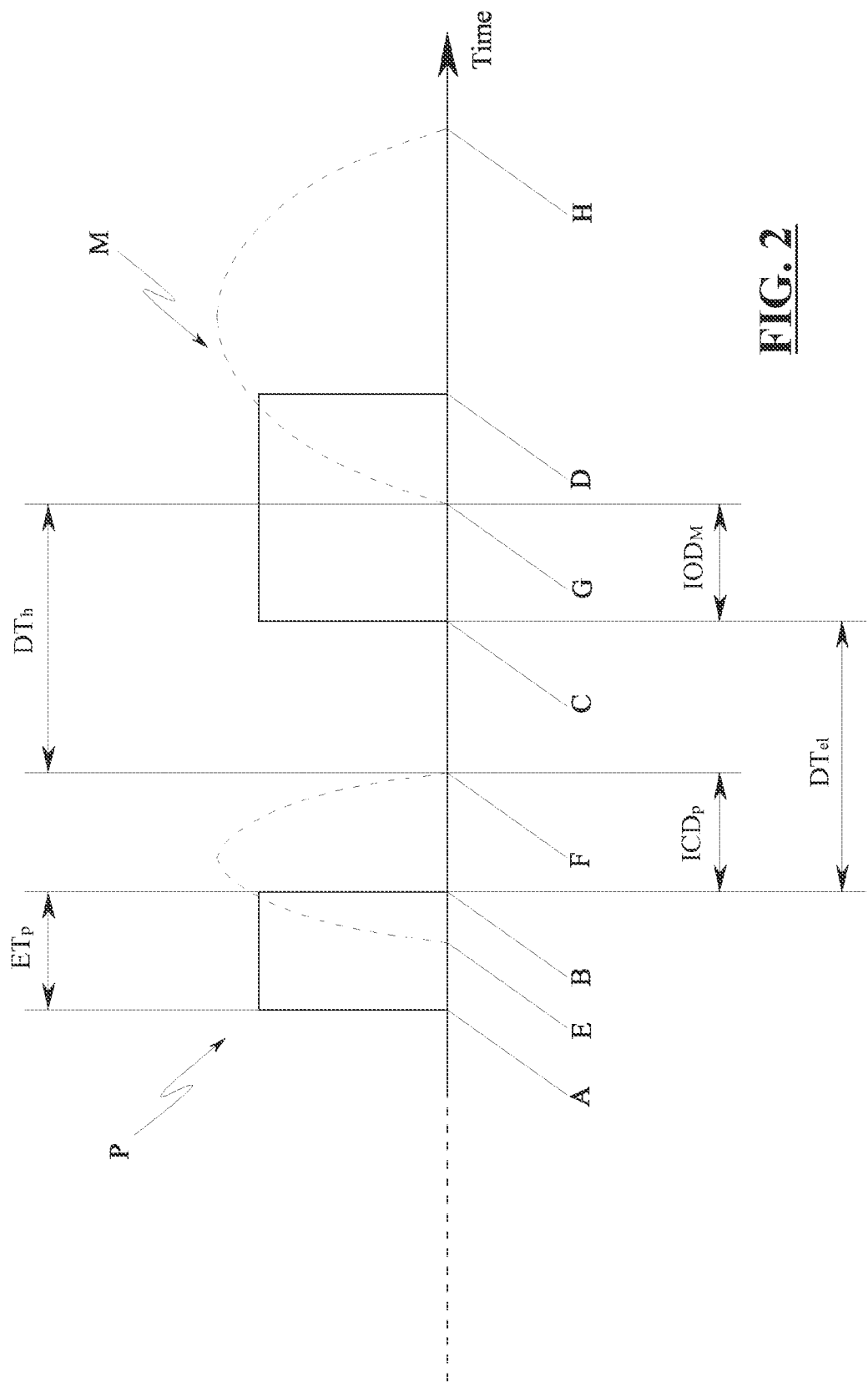
FIG. 2 is schematic illustration of a portion of a fuel injection pattern, which shows along a timeline two subsequent injection pulses performed by a same fuel injector belonging to the internal combustion engine of FIG. 1.

Referring to FIG. 2, the point A of the timeline indicates the instant in which the ECU 18 generates the electric opening command causing the electric driving circuit to supply the electric current responsible of the first injection pulse P; the point B of the timeline indicates the instant in which the ECU 18 generates the electric closing command causing the electric driving circuit to cut off the electric current responsible of the first injection pulse P; the point C of the timeline indicates the instant in which the ECU 18 generates the electric opening command causing the electric driving circuit to supply the electric current responsible of the second injection pulse M; the point D of the timeline indicates the instant in which the ECU 18 generates the electric closing command causing the electric driving circuit to cut off the electric current responsible of the second injection pulse M; the point E of the timeline indicates the instant in which the fuel injectors 12 actually opens, thereby causing the first injection pulse P to start; the point F of the timeline indicates the instant in which the fuel injectors 12 actually closes, thereby causes the first injection pulse P to end; the point G of the timeline indicates the instant in which the fuel injectors 12 actually opens, thereby causing the second injection pulse M to start; the point H of the timeline indicates the instant in which the fuel injectors 12 actually closes, thereby causing the second injection pulse M to end.

As clearly shown, the instant in which the ECU 18 generates an electric opening command generally does not coincides with the instant in which the fuel injector 12 actually opens, as well as the instant in which the ECU 18 generates an electric closing command generally does not coincides with the instant in which the fuel injector actually closes.

Figure 3:
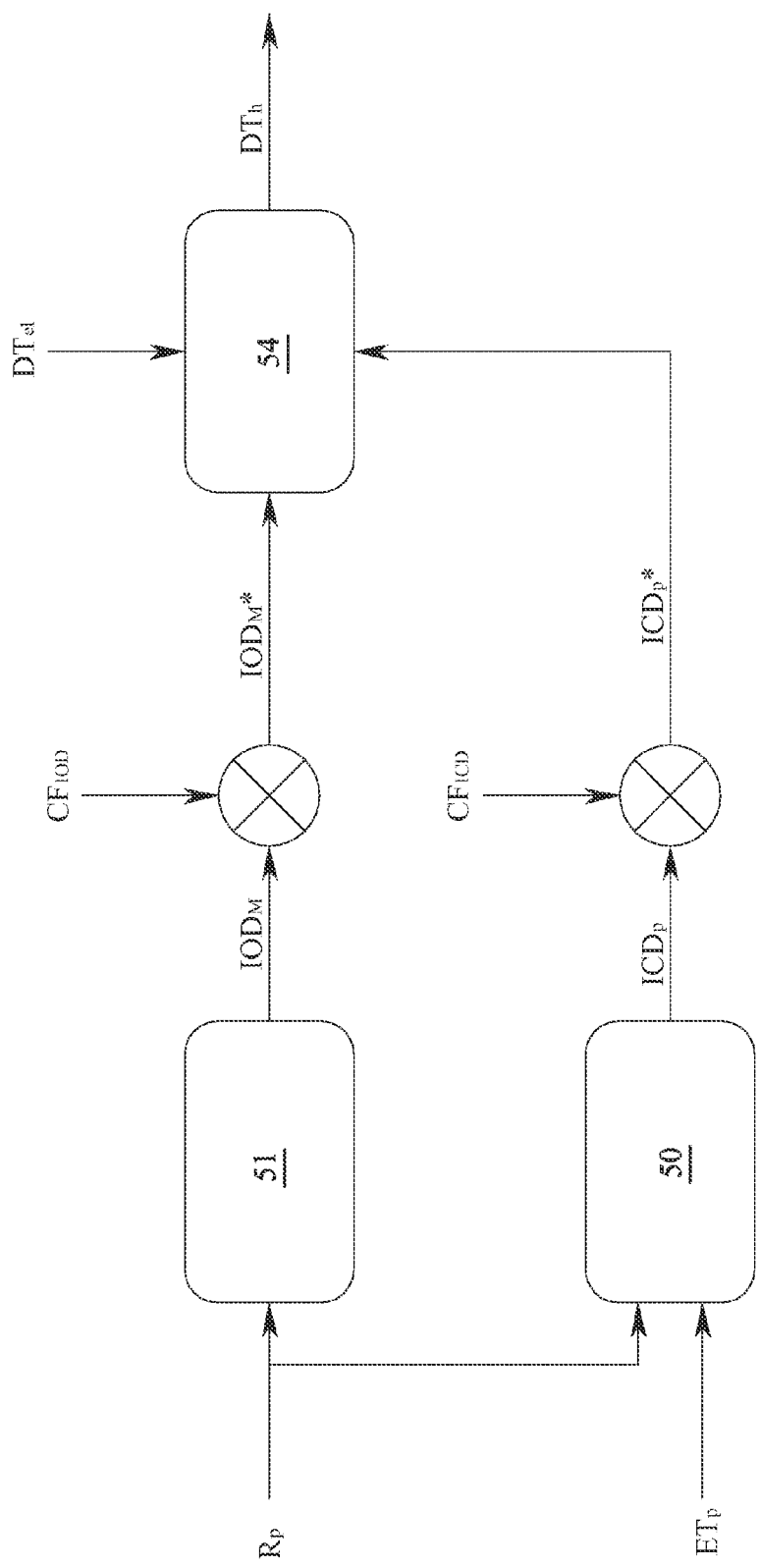
FIG. 3 is a flowchart representing a method for estimating a value of an hydraulic dwell time between the two injection pulses shown in FIG. 2.

An embodiment of the invention provides a method for estimating a value DTh of a hydraulic dwell time between the first injection pulse P and the following second injection pulse M, namely the time between the points F and G of the timeline. As shown in FIG. 3, the method firstly provides for determining a value Rp of the pressure inside the fuel rail 13, a value ETp of the electric energizing time of the first injection pulse P, and a value DTel of the electric dwell time between the first injection pulse P and the second injection pulse M.

The fuel rail pressure value Rp can be measured by means of the pressure sensor 16. The value ETp of the electric energizing time of the first injection pulse P, namely the distance between the point A and B of the timeline, is determined by the ECU 18 using an empirically determined map, which correlates the value of the electric energizing time to a plurality of engine operating parameters, such as for example engine speed, engine load, quantity of fuel to be injected and fuel rail pressure. The values of these engine operating parameters are determined by the ECU 18 and then used as entry values of the map, which returns the value of the electric energizing time. The value DTel of the electric dwell time between the first injection pulse P and the second injection pulse M, namely the distance between the point B and C of the timeline, is determined by the ECU 18 using another empirically determined map, which correlates the value of the electric dwell time to a plurality of engine operating parameters, such as for example engine speed and engine load. The values of these engine operating parameters are determined by the ECU 18 and then used as entry values of the map, which returns the value of the electric dwell time.

Returning to the method illustrated in FIG. 3, the fuel rail pressure value Rp and the energizing time value ETp are used to estimate a value ICDp of the injector closing delay for the first injection pulse P. The injector closing delay for an injection pulse is the time between the instant in which the ECU 18 generates the electric closing command for the injection pulse, and the instant in which the fuel injector 12 actually closes.

The value ICDp of the injector closing delay for the first injection pulse P, namely the distance between the point B and F of the timeline, is estimated by means of a map 50 correlating each couple of values of the fuel rail pressure and of the electric energizing time to a value of the injector closing delay. The map 50 can be empirically determined by means of an experimental activity on a test bench.

According to the method, the fuel rail pressure value Rp is also used to estimate a value IODM of the injector opening delay for the second injection pulse M. The injector opening delay for an injection pulse is the time between the instant in which the ECU 18 generates the electric opening command for the injection pulse, and the instant in which the fuel injector 12 actually opens. The value IODM of the injector opening delay for the second injection pulse M, namely the distance between the point C and G of the timeline, is estimated by means of a map 51 correlating each value of the fuel rail pressure to a correspondent value of the injector opening delay.

Also the map 51 can be empirically determined by means of an experimental activity on a test bench. The value IODM of the injector opening delay is sent to a multiplier 52, which apply to it a correction factor CFIOD, in order to calculate a corrected value IODM* of the injector opening delay for the second injection pulse M.

The correction factor CFIOD is empirically determined for the specific internal combustion engine 10 at the end of the production line, for example through the steps of measuring a value of the injector opening delay of the fuel injectors 12, of calculating the difference between this measured value and the estimated value of the injector opening delay as provided by the map 51, and of determining the correction factor CFIOD on the basis of this difference. In this way, the correction factor CFIOD allows to compensate the effect that the production spread of the fuel injector 12 can have on the injector opening delay.

Likewise, the value ICDP of the injector closing delay is sent to a multiplier 53, which apply to it a correction factor CFICD, in order to calculate a corrected value ICDP* of the injector closing delay for the first injection pulse P. The correction factor CFICD can be determined on the basis of the previously determined correction factor CFIOD, and it is useful for compensating the effect that the production spread of the fuel injector 12 can have on the injector closing delay.

The corrected value ICDP* of the injector closing delay for the first injection pulse P, the corrected value IODM* of the injector opening delay for the second injection pulse M, and the value DTel of the electric dwell time between the first injection pulse P and the second injection pulse M, are sent to a calculating module 54, which calculates the value DTh of an hydraulic dwell time between the first injection pulse P and the subsequent second injection pulse M, according to the following equation:

$$DT_h = DT_{el} + IOD_M^* - ICD_P^*.$$

According to an embodiment, the estimation of the hydraulic dwell between two injection pulses can be advantageously used for the ECU 18 to operate each fuel injectors 12 of the internal combustion engine 10. As stated above, the ECU 18 operates each fuel injector 12 repeatedly generating an electric opening command followed by an electric closing command. The timing of the opening and closing electric commands is still controlled by the ECU 18, which determines, for each injection pulse, the value of the electric energizing time and the value of the electric dwell time from the preceding injection pulse, and then generates the opening and closing electric commands accordingly.

Figure 4:
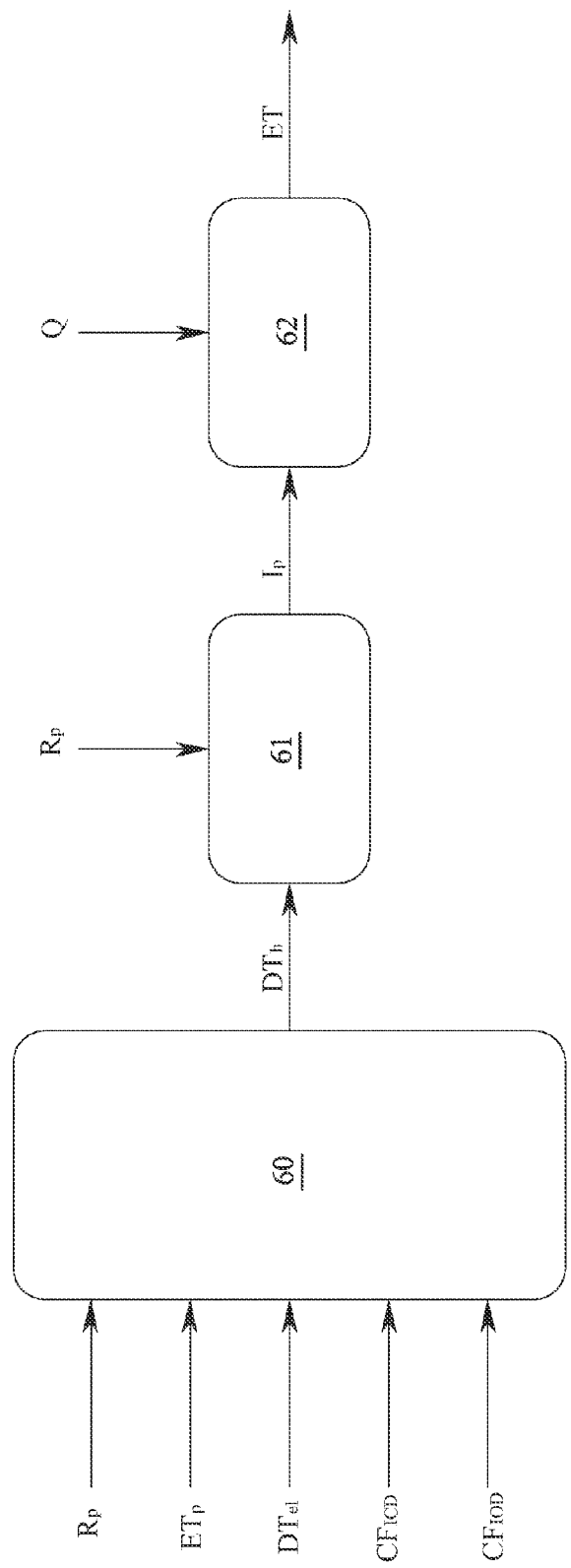
FIG. 4 is a flowchart representing a method for operating a fuel injector of the internal combustion engine of FIG. 1.

The value of the electric dwell time can be determined by the ECU 18 using the already mentioned empirically determined map, which correlates the value of the electric dwell time to a plurality of engine operating parameters, such as for example engine speed and engine load. The value of the electric energizing time can be determined using the strategy illustrated in FIG. 4. This strategy firstly provides for determining the value Q of the fuel quantity to be injected in the course of the injection pulse to be performed. The fuel quantity value Q can be determined through an empirically determined map correlating the fuel quantity to a plurality of engine operating parameters, such as for example engine speed and engine load.

The strategy further provides for estimating the value DTh of the hydraulic dwell time between the injection pulse to be performed and the preceding one. The value DTh is determined implementing the method previously disclosed, and globally represented by the estimating module 60 in FIG. 4, wherein the entry values are: the value Rp of the pressure inside the fuel rail 13; the value ETp of the electric energizing time of the preceding injection pulse, which can be determined during a preceding implementation of the strategy; the value DTel of the electric dwell time between the injection pulse to be performed and the preceding one; and the correction factors CFIOD and CFIOD.

The value DTh of the hydraulic dwell time is sent to a second estimating module 61, which estimates the value Ip of the pressure in the inlet 120 of the fuel injector 12, at the instant in which the fuel injector 12 is expected to actually open. In greater details, the pressure value Ip is estimated by the module 61 on the basis of the hydraulic dwell time value DTh and of the fuel rail pressure value Rp. This estimation can be carried out using the map based strategy or the model based strategy mentioned in the preamble.

The pressure value Ip is finally sent to a module 62 which determines the value ET of the electric energizing time of the injection pulse to be performed. In greater details, the value ET is determined by the module 62 on the basis of the pressure value Ip and of the value Q of the fuel quantity to be injected. By way of example, the module 62 can comprise an empirically determined map correlating the electric energizing time to the injector inlet pressure and the fuel quantity.

According to an embodiment, the method for estimating the hydraulic dwell time, as well as the method for operating the fuel injector 12 using said estimation, can be performed with the help of a computer program comprising a program-code for carrying out all the steps of each method, which is stored in the data carrier 19 associated to the ECU 18. In this way, when the ECU 18 executes the computer program, all the steps of the methods described above are carried out.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the forgoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and in their legal equivalents.

What is claimed is:

1. A method for estimating an hydraulic dwell time between a first injection pulse and a second injection pulse performed by a fuel injector of an internal combustion engine, the method comprising the steps of:
   determining a value of an electric dwell time between the first injection pulse (P) and the second injection pulse;
   estimating an injector closing delay value of an injector closing delay between an instant in which an electric closing command of the first injection pulse is generated and an instant in which the fuel injector closes;
   estimating an injector opening delay value of an injector opening delay between an instant in which an electric opening command of the second injection pulse is generated and an instant in which the fuel injector opens;
   calculating a value of the hydraulic dwell time as a function of the electric dwell time of the injector closing delay value and of the injector opening delay value.

2. The method according to claim 1, wherein the estimating of the injector closing delay value comprises the steps of:
   determining a fuel rail pressure value of a pressure inside a fuel rail hydraulically connected with the fuel injector;
   determining an electric energizing time value of an electric energizing time of the first injection pulse; and
   estimating the injector closing delay value of the injector closing delay on a basis of the fuel rail pressure value and of the electric energizing time value.

3. The method according to claim 2, wherein the injector closing delay value of the injector closing delay is estimated with an empirically determined map correlating the injector closing delay value to the fuel rail pressure value and to the electric energizing time value.

4. The method according to claim 2, wherein said injector closing delay value of the injector closing delay is estimated with a mathematical model, which returns the injector closing delay value of the injector closing delay as a function of the fuel rail pressure value and of the electric energizing time value.

5. The method according to claim 2, wherein the injector closing delay value of the injector closing delay can be corrected by applying to it an empirically determined correction factor.

6. The method according to claim 1, wherein the estimating of said injector opening delay comprises the steps of:
   determining a fuel rail pressure value of a pressure inside a fuel rail hydraulically connected with the fuel injector; and
   estimating the injector opening delay value of said injector opening delay on a basis of said fuel rail pressure value.

7. The method according to claim 6, wherein said injector opening delay value of the injector opening delay is estimated with an empirically determined map correlating the injector opening delay value to the fuel rail pressure value.

8. The method according to claim 6, wherein said injector opening delay value of the injector opening delay is estimated with a mathematical model, which returns the injector opening delay value of the injector opening delay as a function of the fuel rail pressure value.

9. The method according to claim 6, wherein the injector opening delay value of the injector opening delay can be corrected by applying to it an empirically determined correction factor.

10. A method for operating a fuel injector of an internal combustion engine, comprising the steps of:
    determining a fuel quantity to be injected by said fuel injector in a course of an injection pulse;
    estimating a hydraulic dwell time value of a hydraulic dwell time between said injection pulse and a previous injection pulse performed by the fuel injector;
    estimating a pressure value in said fuel injector on a basis of said hydraulic dwell time value of the hydraulic dwell time;
    using said fuel quantity and said pressure value, in order to determine an electric energizing time value of an electric energizing time of the injection pulse; and
    operating the fuel injector according to the electric energizing time value of the electric energizing time.

11. An internal combustion engine comprising:
    a fuel injector; and
    an engine control unit connected to the fuel injector, the engine control unit configured to:
       determine a value of an electric dwell time between a first injection pulse and a second injection pulse;
       estimate an injector closing delay value of an injector closing delay between an instant in which an electric closing command of the first injection pulse is generated and an instant in which the fuel injector closes;

estimate an injector opening delay value of an injector opening delay between an instant in which an electric opening command of the second injection pulse is generated and an instant in which the fuel injector opens; and calculate a value of a hydraulic dwell time as a function of the electric dwell time of the injector closing delay value and of the injector opening delay value.

12. The internal combustion engine according to claim 11, wherein the estimate of the injector closing delay value comprises:

determining a fuel rail pressure value of a pressure inside a fuel rail hydraulically connected with the fuel injector;

determining an electric energizing time value of an electric energizing time of the first injection pulse; and estimating the injector closing delay value of the injector closing delay on a basis of the fuel rail pressure value and of the electric energizing time value.

13. The internal combustion engine according to claim 12, wherein the injector closing delay value of the injector closing delay is estimated with an empirically determined map correlating the injector closing delay value to the fuel rail pressure value and to the electric energizing time value.

14. The internal combustion engine according to claim 12, wherein said injector closing delay value of the injector closing delay is estimated with a mathematical model, which returns the injector closing delay value of the injector closing delay as a function of the fuel rail pressure value and of the electric energizing time value.

15. The internal combustion engine according to claim 12, wherein the injector closing delay value of the injector closing delay can be corrected by applying to it an empirically determined correction factor.

16. The internal combustion engine according to claim 11, wherein the estimate of said injector opening delay comprises:

determining a fuel rail pressure value of a pressure inside a fuel rail hydraulically connected with the fuel injector; and estimating the injector opening delay value of said injector opening delay on a basis of said fuel rail pressure value.

17. The internal combustion engine according to claim 16, wherein said injector opening delay value of the injector opening delay is estimated with an empirically determined map correlating the injector opening delay value to the fuel rail pressure value.

18. The internal combustion engine according to claim 16, wherein said injector opening delay value of the injector opening delay is estimated with a mathematical model, which returns the injector opening delay value of the injector opening delay as a function of the fuel rail pressure value.

19. The internal combustion engine according to claim 16, wherein the injector opening delay value of the injector opening delay can be corrected by applying to it an empirically determined correction factor.

* * * * *